(12) United States Patent
Shen et al.

(10) Patent No.: US 8,335,165 B2
(45) Date of Patent: Dec. 18, 2012

(54) TRANSMISSION OF MULTIPLE ACK/NAK BITS WITH DATA

(75) Inventors: Zukang Shen, Richardson, TX (US); Jing Jiang, Allen, TX (US); Tarik Muharemovic, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 686 days.

(21) Appl. No.: 12/397,763

(22) Filed: Mar. 4, 2009

(65) Prior Publication Data

US 2009/0225700 A1 Sep. 10, 2009

Related U.S. Application Data

(60) Provisional application No. 61/033,592, filed on Mar. 4, 2008, provisional application No. 61/035,502, filed on Mar. 11, 2008, provisional application No. 61/047,586, filed on Apr. 24, 2008.

(51) Int. Cl.
*H04L 12/26* (2006.01)
*H04W 72/08* (2009.01)
*H04B 72/216* (2006.01)

(52) U.S. Cl. ..... 370/252; 370/329; 370/335; 455/452.1; 714/750

(58) Field of Classification Search .................. 370/328, 370/329, 330, 336, 335, 294, 280, 252; 714/749–750
See application file for complete search history.

(56) References Cited

U.S. PATENT DOCUMENTS

| 6,671,849 | B2* | 12/2003 | Tripathi et al. | 714/746 |
|---|---|---|---|---|
| 7,385,976 | B2* | 6/2008 | Gu et al. | 370/389 |
| 7,813,324 | B1* | 10/2010 | Goel et al. | 370/336 |
| 2004/0105386 | A1* | 6/2004 | Sipola | 370/230.1 |
| 2005/0013263 | A1* | 1/2005 | Kim et al. | 370/320 |
| 2006/0034274 | A1* | 2/2006 | Kakani et al. | 370/389 |
| 2007/0211656 | A1* | 9/2007 | Kwak et al. | 370/319 |
| 2008/0080423 | A1* | 4/2008 | Kolding et al. | 370/329 |
| 2008/0095252 | A1* | 4/2008 | Kim et al. | 375/260 |
| 2008/0253318 | A1* | 10/2008 | Malladi et al. | 370/328 |
| 2009/0046649 | A1* | 2/2009 | Gao et al. | 370/329 |
| 2009/0196204 | A1* | 8/2009 | Astely et al. | 370/280 |
| 2010/0098005 | A1* | 4/2010 | Lee et al. | 370/329 |
| 2011/0002290 | A1* | 1/2011 | Kim et al. | 370/329 |

\* cited by examiner

*Primary Examiner* — Kwang B Yao
*Assistant Examiner* — Candal Elpenord
(74) *Attorney, Agent, or Firm* — Ronald O. Neerings; Wade James Brady, III; Frederick J. Telecky, Jr.

(57) ABSTRACT

This invention is a method of wireless communication having a communications protocol providing more downlink subframes than uplink subframes. The user equipment transmits a combination of a plurality of ACK/NAK response signals and related data. The related data could be the number of bits N of the plurality of ACK/NAK response signals or the number of detected downlink communications grants S requiring ACK/NAK response signals. This related data could be a cyclical redundancy check set of bits which may be scrambled upon the numbers N or S. Similar selections are feasible with resource elements or an index of a modulation symbol or codeword.

13 Claims, 9 Drawing Sheets

TRANSMISSION OF MULTIPLE ACK/NAK BITS WITH DATA

CLAIM OF PRIORITY

This application claims priority under 35 U.S.C. 119(e)(1) to U.S. Provisional Application Nos. 61/033,592 filed Mar. 4, 2008, 61/035,502 filed Mar. 11, 2008 and 61/047,586 filed Mar. 24, 2008.

TECHNICAL FIELD OF THE INVENTION

The technical field of this invention is wireless communications.

BACKGROUND OF THE INVENTION

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UE's data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

FIG. 2 shows the Evolved Universal Terrestrial Radio Access (E-UTRA) time division duplex (TDD) Frame Structure. Different subframes are allocated for downlink (DL) or uplink (UL) transmissions. Table 1 shows applicable DL/UL subframe allocations.

TABLE 1

| Configu-ration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

One interesting property of TDD is that the number of UL and DL subframes can be different. In the configurations where there are more DL subframes than UL subframes, multiple DL subframes are associated with one single UL subframe for transmission of corresponding control signal. For example, for each dynamically scheduled transmission in the DL subframes, acknowledge and non-acknowledge (ACK/NAK) bits need to be transmitted in an associated UL subframe to support proper hybrid automatic repeat request (HARQ) operation. If UE 109 is scheduled in a multiple of DL subframes all of which are associated with one single UL subframe, UE 109 needs to transmit multiple ACK/NAK bits in that single UL subframe.

SUMMARY OF THE INVENTION

This invention is a method of wireless communication having a communications protocol providing more downlink subframes than uplink subframes. The user equipment detects within a frame a plurality of downlink communications, producing either an acknowledge (ACK) response signal or a non-acknowledge (NAK) response signal for each detected downlink communication and transmits a combination of a plurality of ACK/NAK response signals and related data from the mobile user's equipment to a base station.

The related data could be the number of bits N of the plurality of ACK/NAK response signals or the number of detected downlink communications S requiring ACK/NAK response signals. The plural ACK/NAK signals could be coded after production and before transmission. The coding could include block coding, convolutional coding and turbo coding.

The user equipment could produce a cyclical redundancy check set of bits of the ACK/NAK signals for transmission. The cyclical redundancy check bits could be scrambled for transmission dependent upon the numbers N or S. As an example, an even number would use a first value for scrambling and an odd number would use a second value for scrambling. Similar selections are feasible with resource elements or an index of a modulation symbol or codeword.

The N bits of the plurality of ACK/NAK response signals could be compressed into M bits where 0<M<N. In a preferred embodiment M is predetermined.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
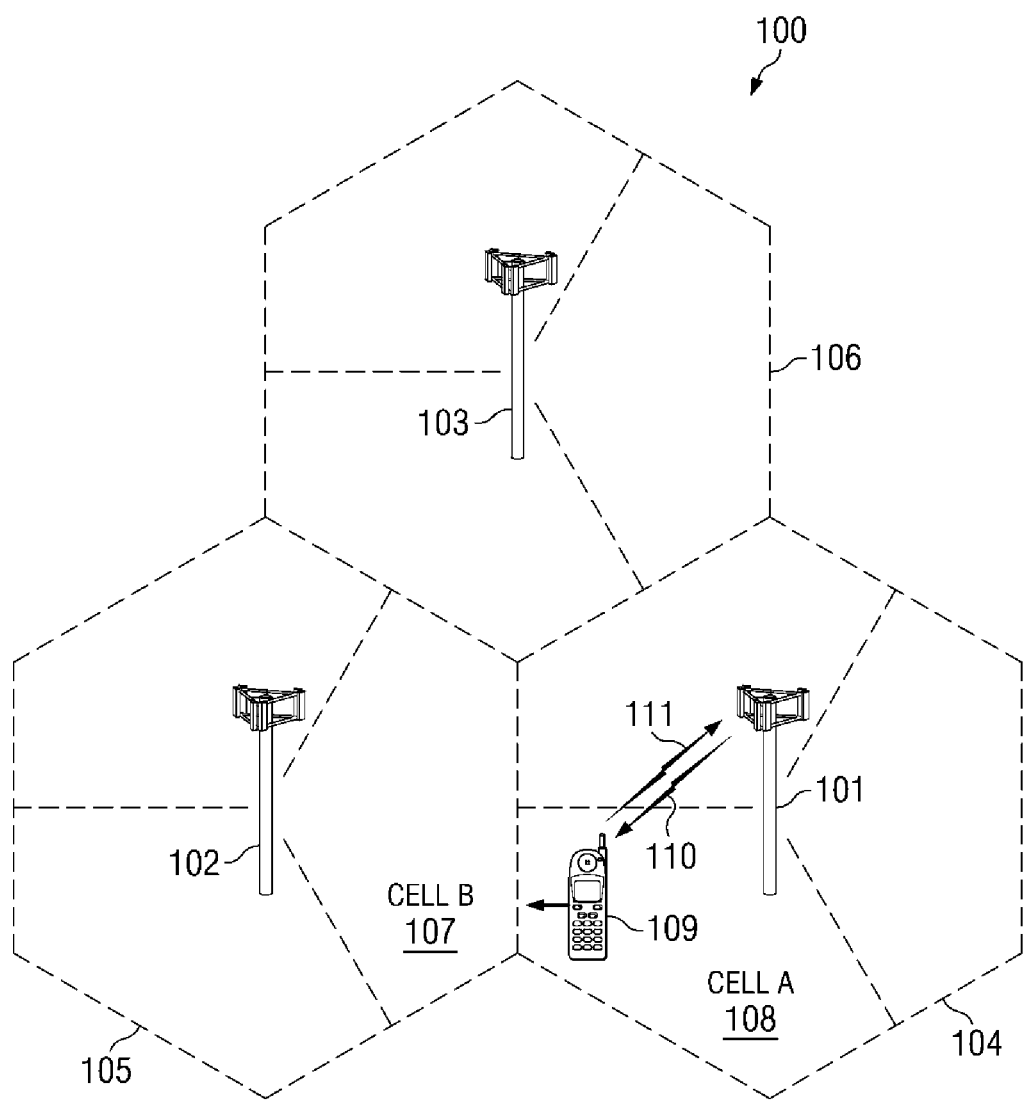
FIG. 1 is a diagram of a communication system of the prior art related to this invention having three cells.
Figure 2:
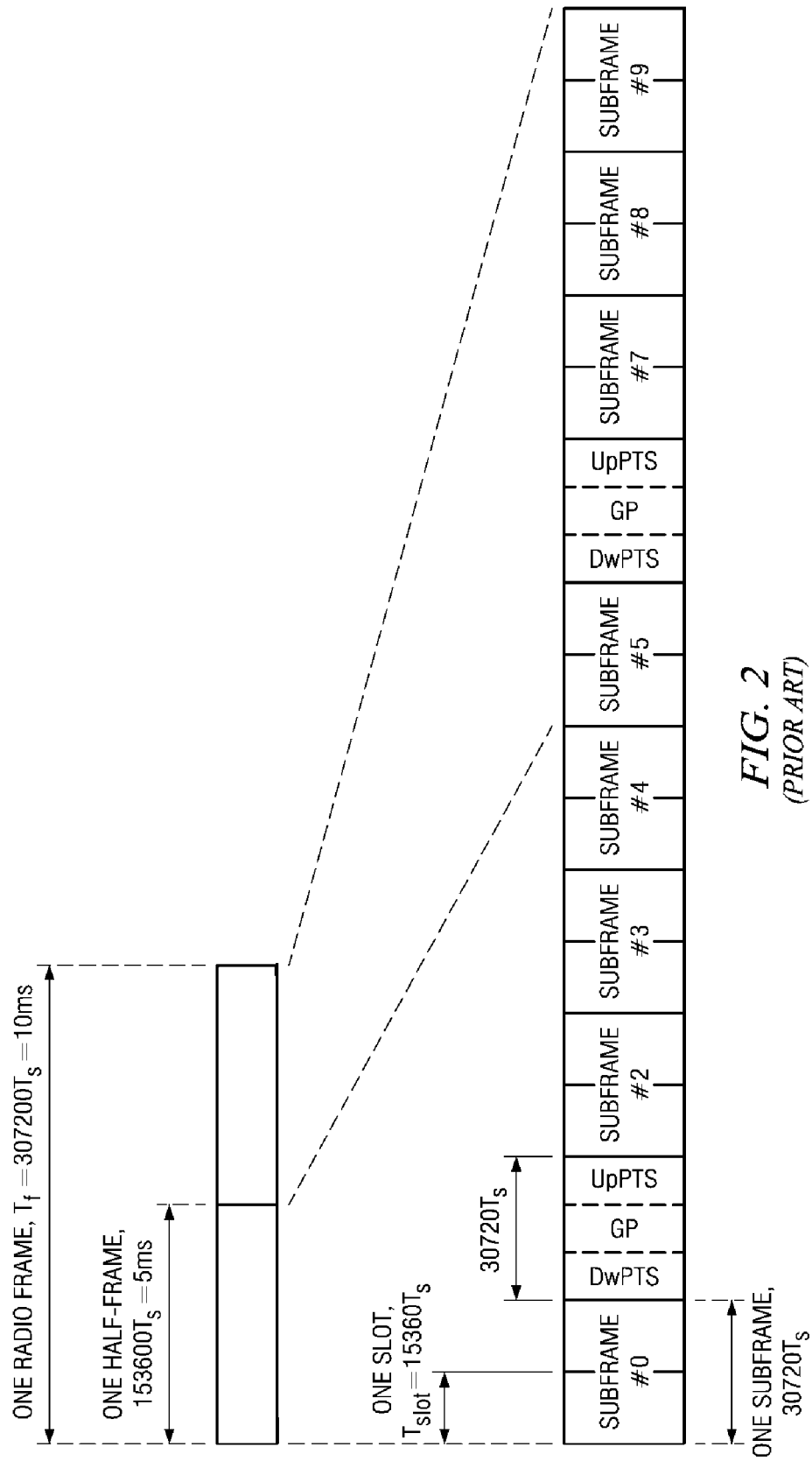
FIG. 2 shows the Evolved Universal Terrestrial Radio Access (E-UTRA) TDD Frame Structure of the prior art.
Figure 3:
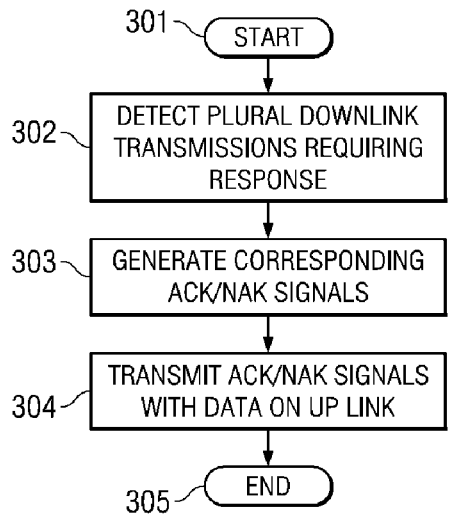
FIG. 3 is a flow chart of the basic response of this invention.

FIG. 3 illustrates a flow chart of the basic response of UE 109. The process starts at start block 301. In block 302 UE 109 detects plural down link transmissions requiring response. In block 303 UE 109 generates the ACK/NAK signal for the respective down link transmissions. In block 304 UE 109 transmits the ACK/NAK signals together with uplink payload data dependent upon the ACK/NAK signals. This basic response ends at end block 304.

This invention includes techniques for the transmission of multiple ACK/NAK bits with data. Typically, the transmission of multiple ACK/NAK bits and data occurs on a data channel such as physical uplink shared channel (PUSCH) in 3GPP long term evolution (LTE). The inventive techniques are mostly applicable to TDD systems where UE 109 may need to transmit multiple ACK/NAK bits with data in a subframe. It is also feasible to use the proposed techniques in frequency division duplex (FDD) systems where UE 109 needs to transmit multiple ACK/NAK bits with data in a subframe.

Without loss of generality, assume N is the number of ACK/NAK bits UE 109 needs to transmit with data in a subframe. A straightforward approach is to encode the N ACK/NAK(s) with a coding scheme. These could be block codes, convolutional codes or turbo codes. Accordingly, block 304 includes this encoding. The encoded ACK/NAK bits are transmitted on the data channel preferably closely mapped to the reference signal to obtain better channel estimates.

It is possible for UE 109 to miss one of the multiple DL grants. If this occurs less ACK/NAK bits are transmitted by UE 109 while base station 101 is expecting more ACK/NAK bits. This scenario is often called ACK/NAK DTX. In these cases UE 109 needs to provide additional information to base station 101 so that base station 101 can perform ACK/NAK DTX detection to enable proper HARQ operations. One solution is for UE 109 to explicitly transmit the information on the number of ACK/NAK bits it has in the data within a subframe. Thus UE 109 explicitly transmits N to base station 101. It is preferable that the number N is separately coded from the actual information of the multiple ACK/NAK bits. Therefore, base station 101 can decode N first. This provides sufficient information to decode the N ACK/NAK bits subsequently. However, the number N and the actual ACK/NAK bits may be jointly coded. In this case, base station 101 may need to perform hypothesis testing since it has no prior information on the number of ACK/NAK bits UE 109 is transmitting.

Figure 4:
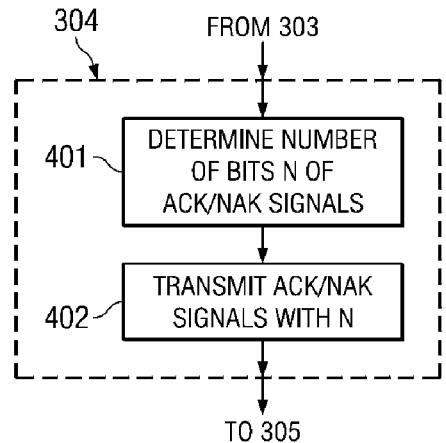
FIG. 4 illustrates an alternate embodiment of block 304 of FIG. 3.

FIG. 4 illustrates an alternate block 304 according to this embodiment. In block 401 UE 109 determines the number of bits N of the plural ACK/NAK signals. In block 402 UE 109 transmits the plural ACK/NAK signals together with this number N.

Without loss of generality, assume S is the number of DL grants UE 109 detects within the time frame where multiple DL subframes are associated with a common UL subframe. It is possible for UE 109 to explicitly convey the value S to base station 101, to facilitate ACK/NAK DTX detection at base station 101.

Figure 5:
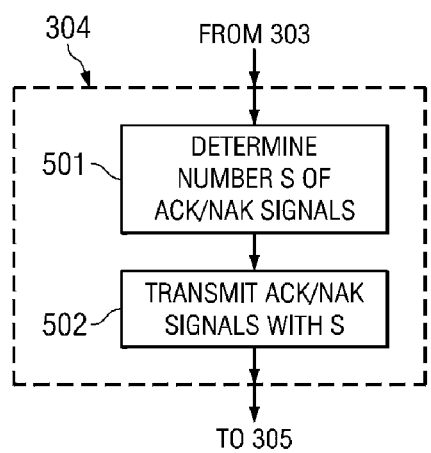
FIG. 5 illustrates an alternate embodiment of block 304 of FIG. 3.

FIG. 5 illustrates an alternate block 304 according to this embodiment. In block 501 UE 109 determines the number S of the plural ACK/NAK signals needed for response. In block 502 UE 109 transmits the plural ACK/NAK signals together with this number S.

Cyclic redundancy check (CRC) bits can be appended to the coded or uncoded ACK/NAK bits. CRC provides additional information to the receiver or base station 101 on whether the ACK/NAK bits are decoded correctly. These CRC bits may be scrambled with the value N. Thus base station 101 can implicitly derive the number of ACK/NAK bits UE 109 is transmitting. In this case, there are N possible ways UE 109 can scramble the ACK/NAK CRC bits corresponding to the different values of N. Alternatively, assuming that UE 109 missing two or more DL grants within a certain time period is unlikely, it may be sufficient to scramble the CRC bits with mod(N, 2). Thus if UE 109 is transmitting an even number of ACK/NAK bits in a subframe, it scrambles the CRC bits with a value A. Otherwise, UE 109 scrambles the CRC bits with a value B. Base station 101 can check the CRC bits after descrambling with values of A and B to determine whether a correct number of ACK/NAK bits were transmitted by UE 109 to perform ACK/NAK DTX detection.

Figure 6:
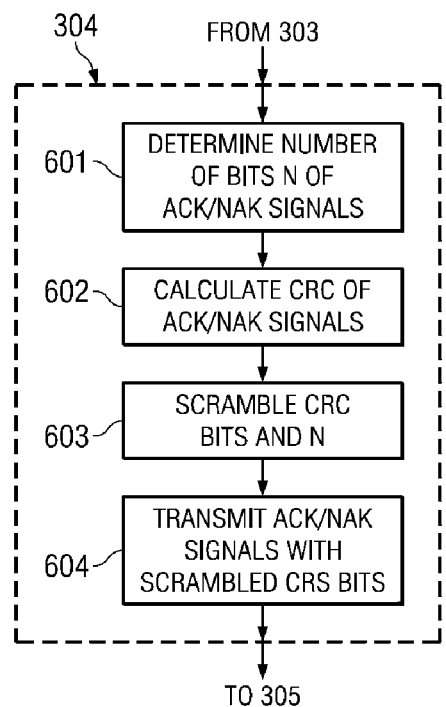
FIG. 6 illustrates an alternate embodiment of block 304 of FIG. 3.

FIG. 6 illustrates another embodiment of block 304 according to one of these options. In block 601 UE 109 determines the number of bits N of the plural ACK/NAK signals. In block 602 UE 109 calculates CRC bits corresponding to the ACK/NAK signals. In block 603 UE 109 scrambles the CRC bits and the number of bits N. In block 604 UE 109 transmits the ACK/NAK signals together with the scrambled CRC bits.

Figure 7:
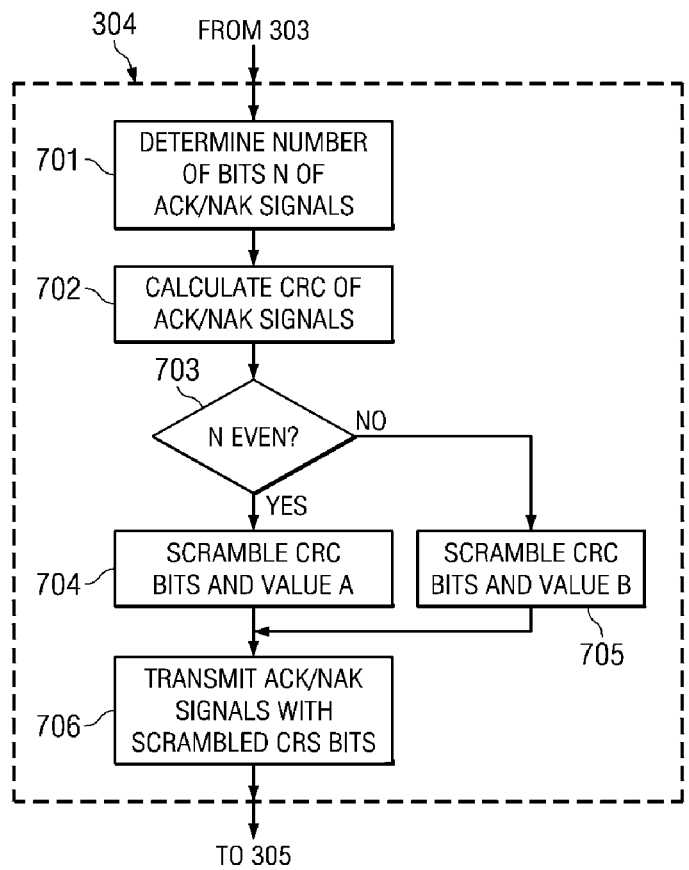
FIG. 7 illustrates an alternate embodiment of block 304 of FIG. 3.

FIG. 7 illustrates another embodiment of block 304 according to another of these options. In block 701 UE 109 determines the number of bits N of the plural ACK/NAK signals. In block 702 UE 109 calculates CRC bits corresponding to the ACK/NAK signals. In block 703 UE 109 determines if the number of bits N is even. If this number of bits is even (Yes at block 703), then in block 704 UE 109 scrambles the CRC bits with a first value A. If this number of bits is odd (No at block 703), then in block 705 UE 109 scrambles the CRC bits with a second value B. In block 706 UE 109 transmits the ACK/NAK signals together with the scrambled CRC bits.

For single data stream transmission in all scheduled DL subframes N=S. For multiple data stream transmission:

$$N = \sum_{i=1}^{S} d(i)$$

where: d(i) is the number of data streams in the ith scheduled DL subframe. It is possible to scramble the CRC bits with the value S. Thus base station 101 can implicitly determine the number of detected DL grants by UE 109. In this case, there are S possible ways UE 109 can scramble the ACK/NAK CRC bits corresponding to different values of S. Alternatively, assuming that UE 109 missing two or more DL grants within a certain time period is unlikely, it may be sufficient to scramble the CRC bits with mod(S, 2). If UE 109 detects an even number of DL grants, it scrambles the CRC bits with value A. Otherwise, UE 109 scrambles the CRC bits with value B. Base station 101 can check the CRC bits after descrambling with value A and B to determine whether a correct number of DL grants are detected by UE 109 to perform ACK/NAK DTX detection.

Figure 8:
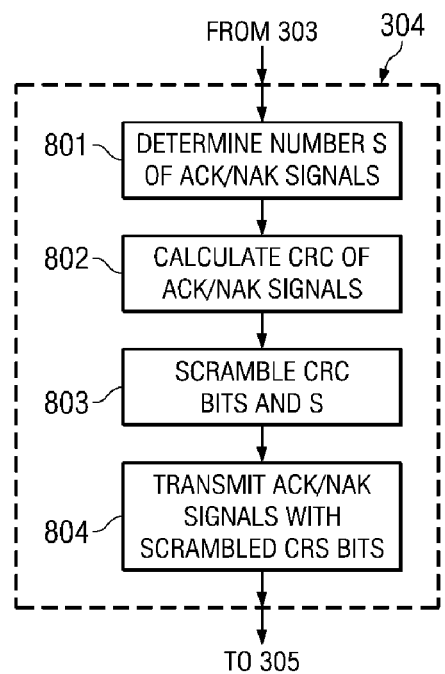
FIG. 8 illustrates an alternate embodiment of block 304 of FIG. 3.

FIG. 8 illustrates another embodiment of block 304 according to one of these options. In block 801 UE 109 determines the number S of the plural ACK/NAK signals needed for response. In block 802 UE 109 calculates CRC bits corresponding to the ACK/NAK signals. In block 803 UE 109 scrambles the CRC bits and the number S. In block 804 UE 109 transmits the ACK/NAK signals together with the scrambled CRC bits.

Figure 9:
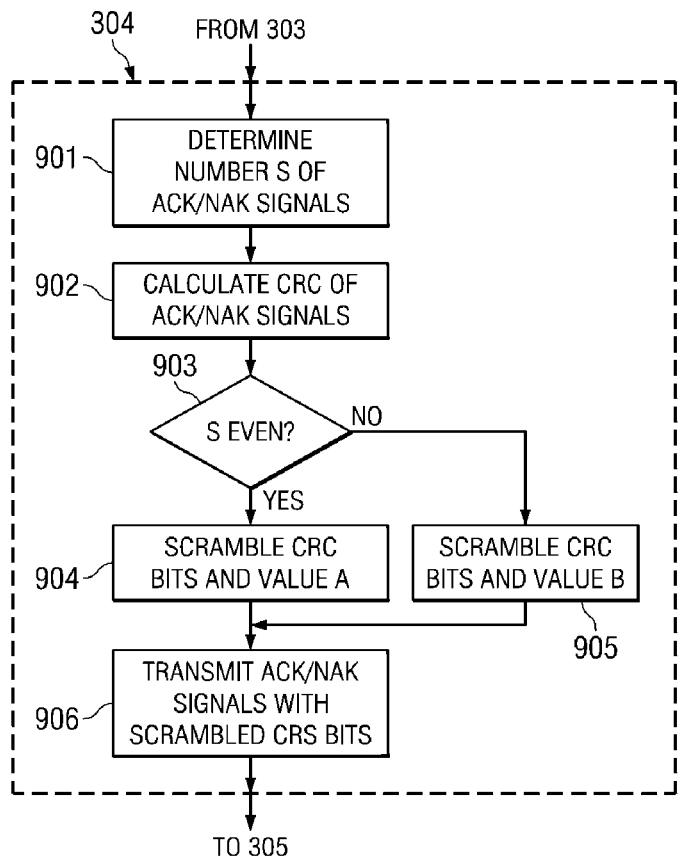
FIG. 9 illustrates an alternate embodiment of block 304 of FIG. 3.

FIG. 9 illustrates another embodiment of block 304 according to another of these options. In block 901 UE 109 determines the number S of the plural ACK/NAK signals needed for response. In block 902 UE 109 calculates CRC bits corresponding to the ACK/NAK signals. In block 903 UE 109 determines if the number S is even. If S is even (Yes at block 903), then in block 904 UE 109 scrambles the CRC bits with a first value A. If S is odd (No at block 903), then in block 905 UE 109 scrambles the CRC bits with a second value B. In block 906 UE 109 transmits the ACK/NAK signals together with the scrambled CRC bits.

ACK/NAK bundling or compression is commonly employed to reduce the resources needed for the transmission of ACK/NAK bits. Thus N ACK/NAK bits are compressed into M ACK/NAK bits, where 0<M<N. The compressed M ACK/NAK bits are transmitted on the data channel with proper a coding scheme such as block codes, convolutional codes or turbo codes with an optional CRC attachment as previously described. The value of M can be predetermined and thus known at base station 101 to avoid unnecessary hypothesis testing. Base station 101 will not know N a prior since UE 109 may miss one or multiple DL grants. Such misses control the number of ACK/NAK bits UE 109 transmits. UE 109 may explicitly or implicitly signal the value of N to base station 101 to enable ACK/NAK DTX detection. UE 109 may explicitly or implicitly signal S to base station 101 to enable ACK/NAK DTX detection at base station 101.

Figure 10:
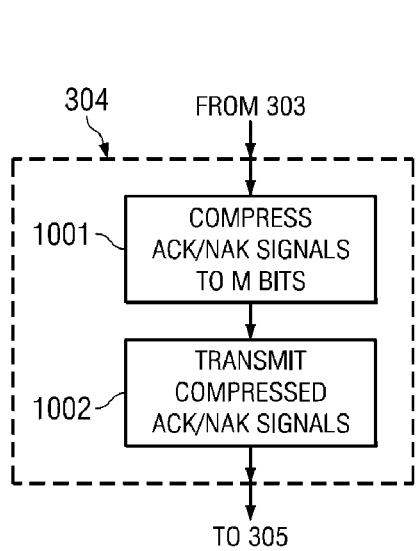
FIG. 10 illustrates an alternate embodiment of block 304 of FIG. 3.

FIG. 10 illustrates an alternate block 304 according to this embodiment. In block 1001 UE 109 compresses the of the plural ACK/NAK signals to M bits. In block 1002 UE 109 transmits the compressed ACK/NAK signals.

As a further alternative UE 109 may implicitly signal the number of ACK/NAK bits N or the number of detected DL grants S to base station 101 by the positions of resource elements (REs) used for ACK/NAK transmission. A resource element is a time-frequency resource. UE 109 can choose different REs for the transmission of ACK/NAK bits. Base station 101 needs to perform hypothesis testing on all possible RE locations where ACK/NAK bits can be transmitted to determine N or S. Suppose two RE regions are defined for ACK/NAK transmission. If the number of ACK/NAK bits or the number of detected DL grants is even, then a first RE region is used for ACK/NAK transmission. Otherwise a second RE region is used for ACK/NAK transmission. More than two RE regions can be defined to implicitly convey partial information on N or S. This RE region dependent ACK/NAK transmission can be applied in conjunction with ACK/NAK bundling or compression. The compressed M ACK/NAK bits are transmitted on the selected ACK/NAK RE region which is dependent on the value of N or S.

Figure 11:
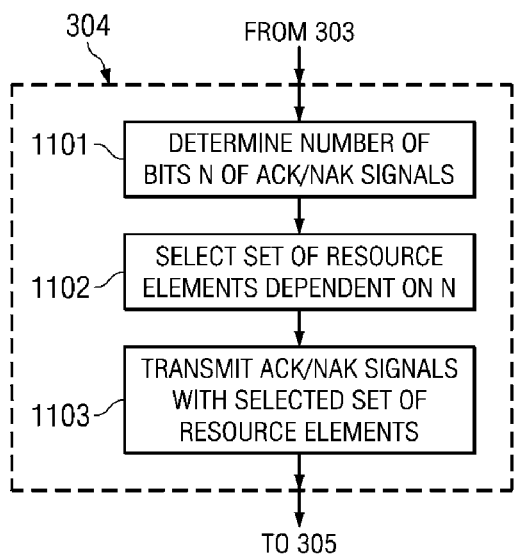
FIG. 11 illustrates an alternate embodiment of block 304 of FIG. 3.

FIG. 11 illustrates another embodiment of block 304 according to one of these options. In block 1101 UE 109 determines the number of bits N of the plural ACK/NAK signals. In block 1102 UE 109 selects one of a plurality of possible resource elements according to the number of bits N. In block 1103 UE 109 transmits the ACK/NAK signals using the selected resource element.

Figure 12:
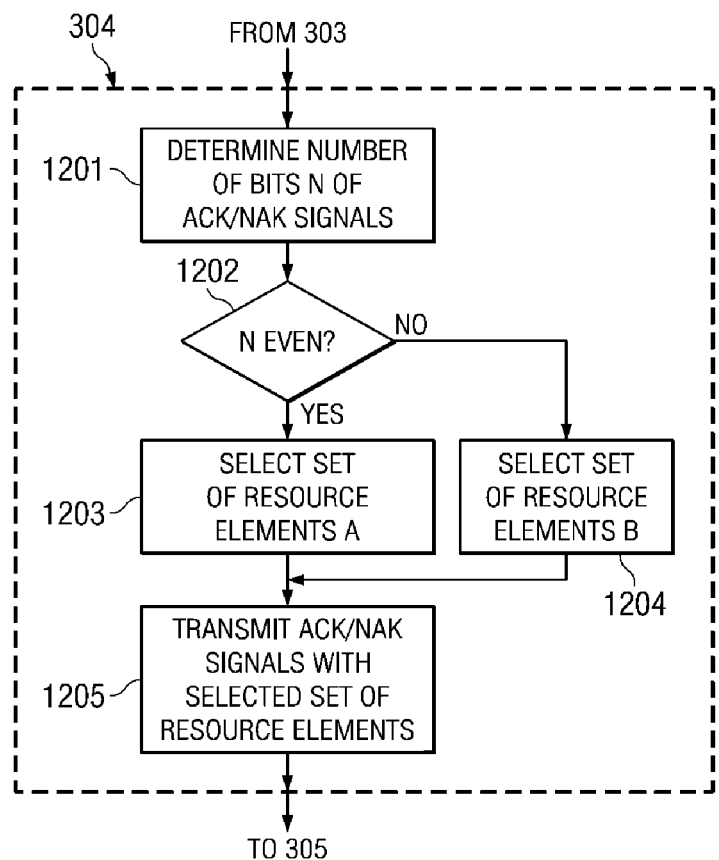
FIG. 12 illustrates an alternate embodiment of block 304 of FIG. 3.

FIG. 12 illustrates another embodiment of block 304 according to another of these options. In block 1201 UE 109 determines the number of bits N of the plural ACK/NAK signals. In block 1202 UE 109 determines if the number of bits N is even. If this number of bits is even (Yes at block 1202), then in block 1203 UE 109 selects a first resource element A. If this number of bits is odd (No at block 1202), then in block 1204 UE 109 selects a second resource element B. In block 1205 UE 109 transmits the ACK/NAK signals using the selected resource element.

Figure 13:
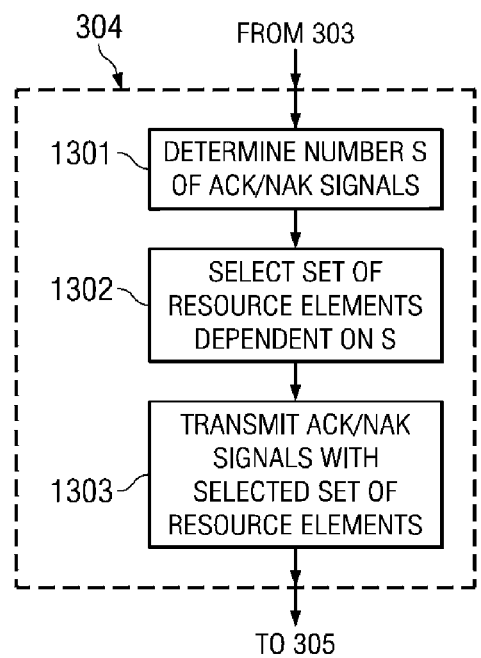
FIG. 13 illustrates an alternate embodiment of block 304 of FIG. 3.

FIG. 13 illustrates another embodiment of block 304 according to another of these options. In block 1301 UE 109 determines the number S of the plural ACK/NAK signals needed for response. In block 1302 UE 109 selects one of a plurality of possible resource elements according to the number S. In block 1303 UE 109 transmits the ACK/NAK signals using the selected resource element.

Figure 14:
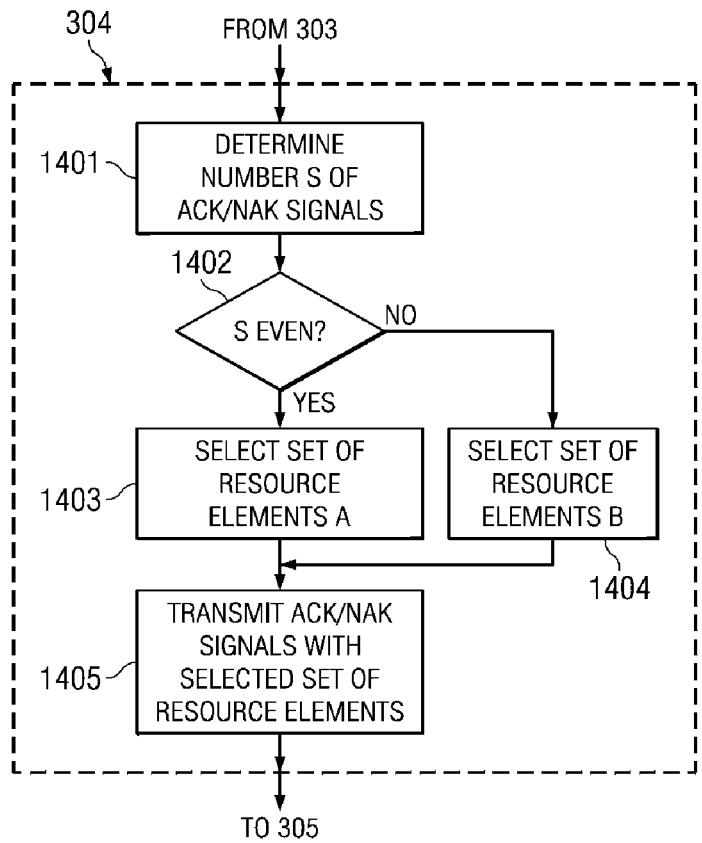
FIG. 14 illustrates an alternate embodiment of block 304 of FIG. 3.

FIG. 14 illustrates another embodiment of block 304 according to another of these options. In block 1401 UE 109 determines the number S of the plural ACK/NAK signals needed for response. In block 1402 UE 109 determines if the number S is even. If S is even (Yes at block 1402), then in block 1403 UE 109 selects a first resource element A. If S is odd (No at block 1402), then in block 1404 UE 109 selects a second resource element B. In block 1405 UE 109 transmits the ACK/NAK signals using the selected resource element.

In a yet further alternative UE 109 may implicitly signal the number of ACK/NAK bits N or the number of detected DL grants S to base station 101 by the index of the set of modulation symbols or codewords it is currently using for the transmission of ACK/NAK bits. The possible modulation symbols or codewords can be divided into two sets denoted $S_1$ and $S_2$. If a modulation symbol or a codeword in set $S_1$ is used, base station 101 determines that an even number of ACK/NAK bits were transmitted by UE 109 or an even number of DL grants were detected by UE 109. Otherwise base station 101 determines that an odd number of ACK/NAK were transmitted or an odd number of DL grants were detected. More than two sets of modulation symbols or codewords could be defined for implicit transmission of partial information of N or S values. This set dependent ACK/NAK transmission can be applied in conjunction with ACK/NAK bundling or compression. One modulation symbol or codeword within the selected set could be chosen and transmitted to convey the compressed M ACK/NAK bits.

The proposed RE region dependent ACK/NAK transmission could be applied together with the modulation symbol or codeword set dependent ACK/NAK transmission and ACK/NAK bundling or compression. The transmission of multiple ACK/NAK bits could be applied for ACK/NAK transmission without any data transmission. The transmission of multiple ACK/NAK bits could be employed in either TDD or FDD systems.

Figure 15:
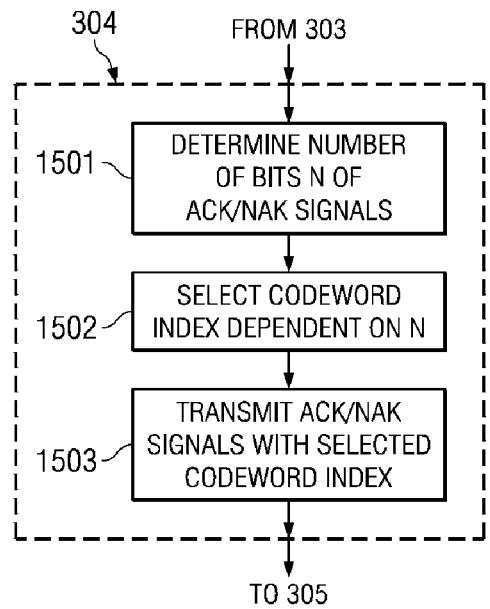
FIG. 15 illustrates an alternate embodiment of block 304 of FIG. 3.

FIG. 15 illustrates another embodiment of block 304 according to one of these options. In block 1501 UE 109 determines the number of bits N of the plural ACK/NAK signals. In block 1502 UE 109 selects one of a plurality of possible indices according to the number of bits N. In block 1503 UE 109 transmits the ACK/NAK signals using the selected index.

Figure 16:
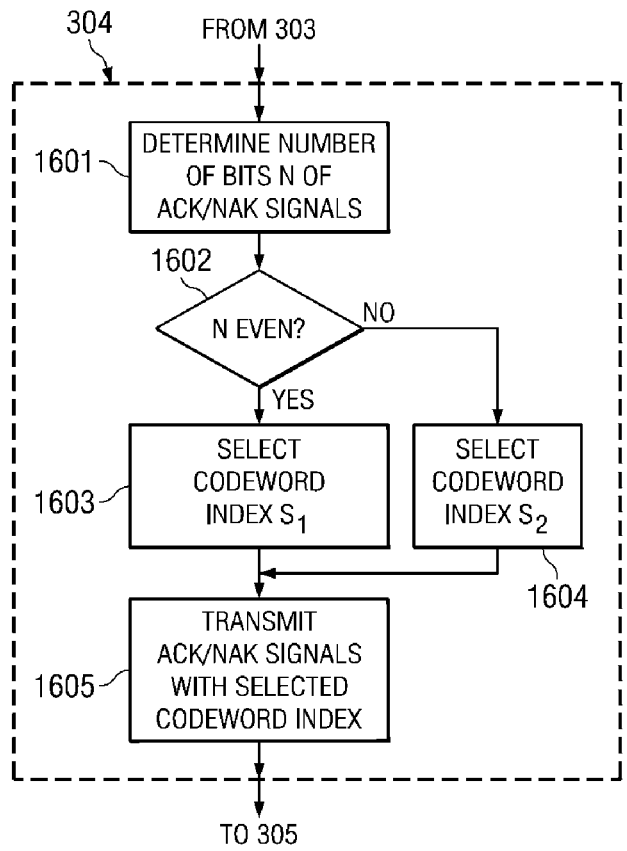
FIG. 16 illustrates an alternate embodiment of block 304 of FIG. 3.

FIG. 16 illustrates another embodiment of block 304 according to another of these options. In block 1601 UE 109 determines the number of bits N of the plural ACK/NAK signals. In block 1602 UE 109 determines if the number of bits N is even. If this number of bits is even (Yes at block 1602), then in block 1603 UE 109 selects a first index $S_1$. If this number of bits is odd (No at block 1602), then in block 1604 UE 109 selects a second index $S_2$. In block 1505 UE 109 transmits the ACK/NAK signals using the selected index.

Figure 17:
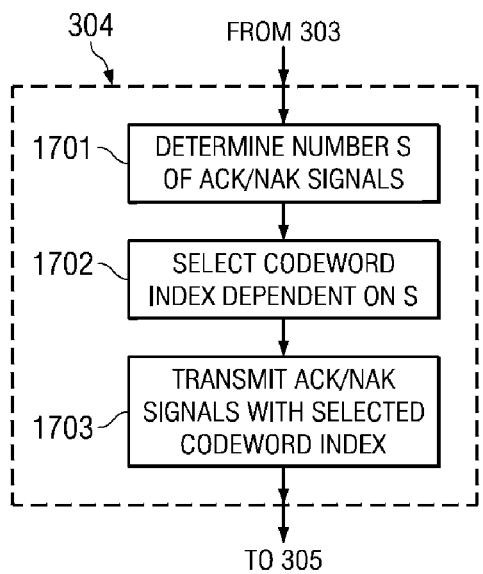
FIG. 17 illustrates an alternate embodiment of block 304 of FIG. 3.

FIG. 17 illustrates another embodiment of block 304 according to another of these options. In block 1701 UE 109 determines the number S of the plural ACK/NAK signals needed for response. In block 1702 UE 109 selects one of a plurality of possible indices according to the number S. In block 1703 UE 109 transmits the ACK/NAK signals using the selected index.

Figure 18:
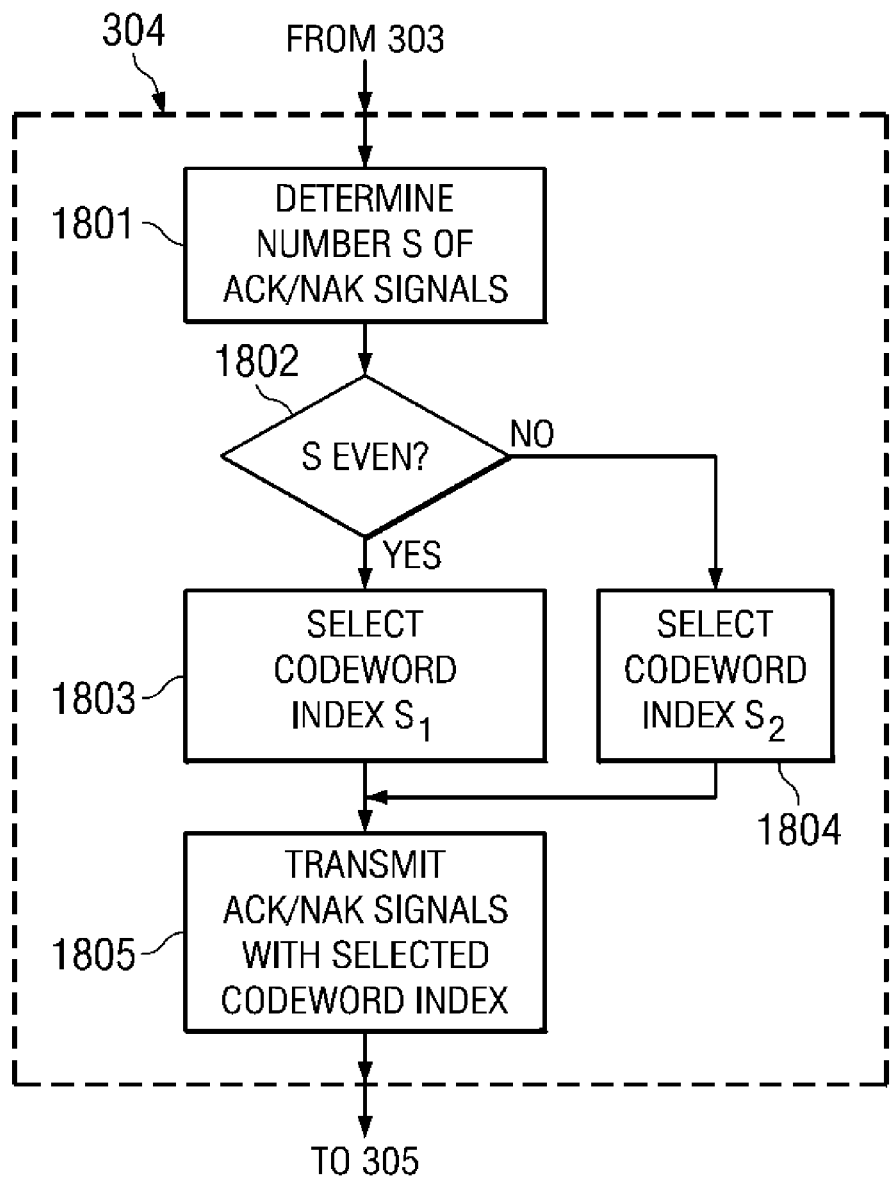
FIG. 18 illustrates an alternate embodiment of block 304 of FIG. 3.

FIG. 18 illustrates another embodiment of block 304 according to another of these options. In block 1801 UE 109 determines the number S of the plural ACK/NAK signals needed for response. In block 1802 UE 109 determines if the number S is even. If S is even (Yes at block 1802), then in block 1803 UE 109 selects a first index $S_1$. If S is odd (No at block 1802), then in block 1804 UE 109 selects a second index $S_2$. In block 1805 UE 109 transmits the ACK/NAK signals using the selected index.

Assume for a certain bundling window of size there are T DL subframes associated with one UL subframe. The maximum number of ACK/NAK bits UE 109 may have within the bundling window is 2T. This is because there could be two DL data streams per DL subframe with multiple input multiple output (MIMO) operation. Alternatively UE 109 may be scheduled on a subset of the T DL subframes. For explicit transmission of multiple ACK/NAK bits on PUSCH, UE 109 needs to identify for which subset of DL subframes it detects DL grants. In one possible technique UE 109 always transmit 2T ACK/NAK bits on PUSCH with 2 bits reserved for each DL subframe in the bundling window. For the DL subframes that UE 109 does not detect any DL grant, then NAK or (NAK, NAK) is transmitted as the ACK/NAK bits for the corresponding DL subframes. UE 109 may reserve 1 bit per DL subframe. Thus UE 109 always transmits T ACK/NAK bits on PUSCH, one for each DL subframe. For the DL subframes in which UE 109 does not detect any DL subframe, then NAK is transmitted as the ACK/NAK bit for the corresponding DL subframes. When UE 109 has DL MIMO operation, then the multiple ACK/NAK bits are bundled or compressed into a single ACK/NAK bit per DL subframe by a logical AND operation. These multiple ACK/NAK bits such as 2T or T ACK/NAK bits can be jointly or separately coded, and transmitted on PUSCH.

What is claimed is:

1. A method of wireless communication having a communications protocol providing more downlink subframes than uplink subframes comprising the steps of:
   at a mobile user's equipment detecting within a frame a plurality of downlink communications;
   for each detected downlink communication producing either an acknowledge (ACK) response signal or a non-acknowledge (NAK) response signal;
   determining at the mobile user's equipment a number of bits N of the plurality of ACK/NAK response signals;
   producing at the mobile user's equipment a cyclical redundancy check set of bits of the plurality of N ACK/NAK bits;
   scrambling the cyclical redundancy check set of bits and the number N; and
   employing an uplink subframe to transmit the plurality of ACK/NAK response signals and the scrambled cyclical redundancy check set of bits from the mobile user's equipment to a base station.

2. The method of claim 1, wherein:
   said step of scrambling the cyclical redundancy check set of bits and the number N scrambles the cyclical redundancy check set of bits with a first value A if N is odd and a second value B if N is even.

3. A method of wireless communication having a communications protocol providing more downlink subframes than uplink subframes comprising the steps of:
   at a mobile user's equipment detecting within a frame a plurality of downlink communications;
   for each detected downlink communication producing either an acknowledge (ACK) response signal or a non-acknowledge (NAK) response signal;
   determining at the mobile user's equipment a number of bits N of the plurality of ACK/NAK response signals;
   producing at the mobile user's equipment a cyclical redundancy check set of bits of the plurality of N ACK/NAK bits;
   determining at the mobile user's equipment a number of detected downlink communications grants S requiring ACK/NAK response signals;
   scrambling the cyclical redundancy check set of bits and the number S; and
   employing an uplink subframe to transmit the plurality of ACK/NAK response signals and the scrambled cyclical redundancy check set of bits from the mobile user's equipment to a base station.

4. The method of claim 3, wherein:
   said step of scrambling the cyclical redundancy check set of bits and the number S scrambles the cyclical redundancy check set of bits with a first value A if S is odd and a second value B if S is even.

5. A method of wireless communication having a communications protocol providing more downlink subframes than uplink subframes comprising the steps of:
   at a mobile user's equipment detecting within a frame a plurality of downlink communications;
   for each detected downlink communication producing either an acknowledge (ACK) response signal or a non-acknowledge (NAK) response signal;
   determining at the mobile user's equipment a number of bits N of the plurality of ACK/NAK response signals;
   compressing the N bits of the ACK/NAK response signals into M bits where 0<M<N after production; and employing an uplink subframe to transmit the plurality of ACK/NAK response signals and the cyclical redundancy check set of bits from the mobile user's equipment to a base station.

6. The method of claim 5, wherein:
the number of M bits is predetermined.

7. The method of claim 5, further comprising the steps of:
employing the uplink subframe to transmit the number N from the mobile user's equipment to the base station.

8. A method of wireless communication having a communications protocol providing more downlink subframes than uplink subframes, wherein communications protocol includes 2resource elements for communication and comprising the steps of:
- at a mobile user's equipment detecting within a frame a plurality of downlink communications;
- for each detected downlink communication producing either an acknowledge (ACK) response signal or a non-acknowledge (NAK) response signal;
- determining at the mobile user's equipment a number of bits N of the plurality of ACK/NAK response signals;
- selecting a set of resource elements dependent upon the number N including selecting a first set of resource elements if N is odd and a second set of resource elements if N is even; and
- employing an uplink subframe to transmit the plurality of ACK/NAK response signals from the mobile user's equipment to the base station employing the selected set of resource elements.

9. A method of wireless communication having a communications protocol providing more downlink subframes than uplink subframes, wherein communications protocol includes 2 resource elements for communication and comprising the steps of:
- at a mobile user's equipment detecting within a frame a plurality of downlink communications;
- for each detected downlink communication producing either an acknowledge (ACK) response signal or a non-acknowledge (NAK) response signal;
- determining at the mobile user's equipment a number of detected downlink communications grants S requiring ACK/NAK response signals; and
- selecting a set of resource elements dependent upon the number S including selecting a first set of resource elements if S is odd and a second set of resource elements if S is even; and
- employing an uplink subframe to transmit the plurality of ACK/NAK response signals from the mobile user's equipment to the base station employing the selected set of resource elements.

10. A method of wireless communication having a communications protocol providing more downlink subframes than uplink subframes, wherein communications protocol includes a plurality of indices for modulation symbols/codewords for communication and comprising the steps of:
- at a mobile user's equipment detecting within a frame a plurality of downlink communications;
- for each detected downlink communication producing either an acknowledge (ACK) response signal or a non-acknowledge (NAK) response signal;
- determining at the mobile user's equipment a number of bits N of the plurality of ACK/NAK response signals;
- selecting a codeword index dependent upon the number N; and
- wherein said step of employing the uplink subframe to transmit the plurality of ACK/NAK response signals employs the selected codeword index.

11. The method of claim 10, wherein the number of codeword indices is 2 and wherein:
said step of selecting a codeword index selects a first codeword index if N is odd and a second codeword index if N is even.

12. A method of wireless communication having a communications protocol providing more downlink subframes than uplink subframes, wherein communications protocol includes a plurality of codeword indices for modulation symbols/codewords for communication and comprising the steps of:
- at a mobile user's equipment detecting within a frame a plurality of downlink communications;
- for each detected downlink communication producing either an acknowledge (ACK) response signal or a non-acknowledge (NAK) response signal;
- determining at the mobile user's equipment a number of detected downlink communications grants S requiring ACK/NAK response signals; and
- selecting a codeword index dependent upon the number S; and
- wherein said step of employing the uplink subframe to transmit the plurality of ACK/NAK response signals employs the selected codeword index.

13. The method of claim 12, wherein the number of codeword indices is 2 and wherein:
said step of selecting an index selects a first codeword index if S is odd and a second codeword index if S is even.

* * * * *